US012009012B2

(12) United States Patent
Maneri et al.

(10) Patent No.: US 12,009,012 B2
(45) Date of Patent: Jun. 11, 2024

(54) METHOD OF MERGING DIGITAL MEDIA

(71) Applicant: Logitech Europe S.A., Lausanne (CH)

(72) Inventors: Thomas Maneri, San Diego, CA (US); Sean Elliot Kaiser, Vancouver (CA); Lev Sokolov, Vancouver (CA); Ashray Sameer Urs, San Jose, CA (US)

(73) Assignee: LOGITECH EUROPE S.A., Lausanne (CH)

( * ) Notice: Subject to any disclaimer, the term of this patent is extended or adjusted under 35 U.S.C. 154(b) by 0 days.

(21) Appl. No.: 17/856,905

(22) Filed: Jul. 1, 2022

(65) Prior Publication Data

US 2023/0005508 A1 Jan. 5, 2023

Related U.S. Application Data

(60) Provisional application No. 63/218,297, filed on Jul. 3, 2021.

(51) Int. Cl.
*G11B 27/031* (2006.01)
*G06F 16/783* (2019.01)
*H04N 21/44* (2011.01)

(52) U.S. Cl.
CPC ......... *G11B 27/031* (2013.01); *G06F 16/783* (2019.01); *H04N 21/44* (2013.01)

(58) Field of Classification Search
CPC ...... G11B 27/031; G06F 16/783; H04N 21/44
USPC .................................................. 386/201, 278
See application file for complete search history.

(56) References Cited

U.S. PATENT DOCUMENTS

| 10,735,798 B2* | 8/2020 | Lennon | H04N 21/6547 |
| 11,216,178 B2* | 1/2022 | Choi | G06V 40/166 |
| 11,272,237 B2* | 3/2022 | Ojala | H04N 21/4345 |

* cited by examiner

Primary Examiner — Helen Shibru
(74) Attorney, Agent, or Firm — Patterson & Sheridan LLP (57) ABSTRACT

Embodiments herein provide for methods of dividing selected areas of a first video clip having a first composition, e.g., by generating individual video data corresponding to the selected areas, arranging the selected areas to provide a second composition, e.g., by combining the individual video data to generate composite video data corresponding to the second composition, and compiling the composite video data to provide a second video clip having the second composition.

24 Claims, 3 Drawing Sheets

METHOD OF MERGING DIGITAL MEDIA

CROSS-REFERENCE TO RELATED APPLICATIONS

This application claims benefit of U.S. provisional patent application Ser. No. 63/218,297, filed Jul. 3, 2021, which is herein incorporated by reference.

BACKGROUND

Field

Embodiments of the present invention generally relate to methods of generating media content and, more particularly, to video editing methods for generating a composite video clip suitable for a first display configuration from a video clip generated from a livestream application formatted for a second display configuration.

Description of the Related Art

The online video industry has grown rapidly since YouTube made it simple to share online videos in 2005. Netflix introduced its streaming video service in 2007, followed by Hulu in 2008. All three services focused on pre-recorded video, also known as Video-On-Demand ("VOD") until YouTube introduced YouTube Live in 2008. It marked the first easily accessible implementation of a live streaming video service.

Similarly, video games have evolved from single or multiplayer experiences shared around a single TV to complicated, internet-based multiplayer games that allow hundreds of thousands of players to participate in shared gaming experiences. Fans of video games historically used magazines such as GamePro Magazine to stay abreast of new game releases, uncover otherwise difficult-to-find game secrets, and learn how to optimize their gameplay. Eventually, the medium was replaced by YouTube channels dedicated to video game content.

The popularity of online video game content led to the founding of a new class of Streaming Services: Twitch, founded in 2011, and YouTube Gaming, which came online in 2015. These services allowed players to broadcast their gaming experiences directly to the world. Streaming Services differ from the aforementioned Netflix, Hulu, and YouTube products because they focus on streaming live video instead of pre-recorded VOD content. Today Twitch serves over 170 million visitors every month, and unlike YouTube's VOD product, which primarily serves short-form video, the average Twitch visitor views over an hour of streaming content. In the present disclosure, the term Streaming Services refers to one or more services designed to stream live video content via a digital channel including, but not limited to, Twitch, YouTube Gaming, Mixer, and Facebook Live.

These extended viewing times are enabled by video game fans' voracious appetite for video game content and by Streaming Services such as Twitch or YouTube Gaming providing tools to enable users, the streamers, broadcasting their games to monetize the time they spend streaming their game sessions. These tools include allowing viewers to sign up for a monthly subscription to the channel of specific streamers whose personality or gameplay they enjoy, a chat panel for viewers to chat with each other and the streamer, and extensive application programming interfaces (APIs) for developers to build applications that interface with the Streaming Services. Many streamers can make a substantial living through Streaming Services and the ecosystems they have created. A primary source of income for streamers is donations from viewers, who are more likely to donate during an interactive live stream where the streamer can encourage the donations, the viewers can see the streamer's reaction to the donations, and the streamer can publically thank the individual viewers for the donation.

Key visual elements of the broadcast, such as chat panes, the streamer's local camera feed, and stock or custom overlays, can help streamers engage with their viewers and monetize their channel. Overlays can provide static images, such as decorative video borders or animated graphics that respond in real time to the actions of the viewers or the game. Due to the instantaneous and live nature of video streamed to a Streaming Service, it is not possible to edit a video before it goes live using traditional video editing software. Thus, the desired key visual elements are arranged within the video to provide a desired composition before or concurrently with the video being encoded and sent to Streaming Services for viewer consumption. The composition of the video, e.g., the position and sizing of the individual visual elements over the live video game, can be based on the most likely and desirable display format used by viewers of the interactive live feed. For example, the composition may be configured for viewing on a desktop or laptop display having an HD widescreen aspect ratio of 16:9 (1080p) for viewers who desire to watch and engage with the broadcast for extended periods, e.g., up to an hour or more.

In addition, to live broadcasts, streamers can record their previously streamed video (Past Broadcasts) and publish the recordings to an online video streaming platform as a Video on Demand (VOD) so that fans can watch broadcast events that they were unable to view live. The Past Broadcast recordings may be archived on the Streaming Service account, and the individual visual elements can be arranged to provide a desired composition before the recording is compiled into a format suitable for uploading to the video streaming platform, such as an mp4, mov, avi, or gif format. Streamers can create highlights of their Past Broadcasts by extracting and publishing one or more segments of the recorded Past Broadcast video. Like the recorded Past Broadcasts, the individual visual elements of highlights can be arranged to provide a desired composition before the highlights are published for viewer consumption or compiled into a format suitable for uploading to a video streaming platform. The streamer can use highlights to showcase their best content to new viewers and engage existing viewers when they are not live. However, conventional software that is used to edit and merge the highlights is often complicated, requires multiple repetitive steps, and thus requires a significant amount of time for the streamer to generate and upload the compiled highlight in a desired format that is compatible with the video streaming platform running on a separate user's electronic device.

Viewers and streamers can record and share clips of the streamer's live broadcasts, published Past Broadcasts (VOD), and highlights. Clips are short-form videos that allow viewers and streamers to capture unique or memorable moments from the broadcast event. Clips can be shared through links and uploaded to various media platforms to aid streamers in growing their audience through social sharing. A clip can be a single video segment that incorporates the visual elements of the broadcast in an encoding format suitable for uploading to the social media platform. Unfortunately, the aspect ratio and orientation of the clip, such as the 16:9 widescreen format, is undesirable for viewing on mobile social media applications, such as TikTok® or Instagram® where users prefer to view content in portrait mode (e.g., so they don't have to turn their phone sideways). Further, while suitable for a larger display such as a desktop or laptop monitor, the composition of the clip may be less than desirable for a mobile display.

Accordingly, there is a need in the art for a system and methods that solve the problems described above.

SUMMARY

One embodiment provides a method for generating an output video clip, the method comprising: displaying on a first electronic device an input video clip in an editing screen of an editing preview application; defining a plurality of layers for display in the editing preview application, the plurality of layers including a first layer comprising a first portion of the input video clip and a second layer comprising a second portion of the input video clip; adjusting one or more characteristics of at least one of the first layer and the second layer; forming an output video clip having a plurality of regions; causing the output video clip to be generated from the preview; and causing the output video clip to be transmitted for display on an application running on a second electronic device, wherein the plurality of regions of the output video clip is configured to be displayed in an output video format of the application running on the second electronic device. The plurality of regions of the output video clip each comprise a different layer of the plurality of layers, and the characteristics of the layers in the regions of the plurality of regions, which include the adjusted at least one of the first layer and the second layer, are more similar to each than the characteristics of the initially defined plurality of layers are to each other.

Embodiments of the disclosure may also provide a method for generating an output video clip, the method comprising: displaying on a first electronic device an input video clip in an editing screen of an editing preview application; defining a plurality of layers for display in the editing preview application, the plurality of layers including a first layer comprising a first portion of the input video clip and a second layer comprising a second portion of the input video clip; adjusting one or more characteristics of at least one of the first layer and the second layer; forming an output video clip having a plurality of regions; causing the output video clip to be generated from the preview; and causing the output video clip to be transmitted to a second electronic device. In some embodiments, the plurality of regions each comprise a different layer of the plurality of layers, and the characteristics of the layers in the regions of the plurality of regions, which include the adjusted at least one of the first layer and the second layer, are more similar to each than the characteristics of the initially defined plurality of layers are to each other. In some embodiments, the first layer comprises game content and the second layer comprises a view of a user's camera. In some embodiments, the output video clip has an output format selected for a social media application operated by the second electronic device.

Embodiments of the disclosure may also provide a system for generating an output video clip, the system comprising a processor, and a memory having loaded therein for execution by the processor an edit preview application. The edit preview application is configured to display on a first electronic device an input video clip in an editing screen of an editing preview application, define a plurality of layers for display in the editing preview application, the plurality of layers including a first layer comprising a first portion of the input video clip and a second layer comprising a second portion of the input video clip, adjust characteristics of at least one of the first layer and the second layer; form an output video clip in which the first layer and the second layer are each disposed in separate regions of a plurality of regions formed within the output video clip, wherein the adjusted characteristics of the at least one of the first layer and the second layer makes characteristics of the first layer and the second layer more similar to each other; cause the output video clip to be generated from the preview; and cause the output video clip to be transmitted for display on an application running on a second electronic device, wherein the plurality of regions of the output video clip is configured to be displayed in an output video format of the application running on the second electronic device.

Embodiments of the disclosure may also provide a non-transitory computer-readable medium comprising instructions that are executable in a processor of a computer system to carry out a method of scheduling a plurality of workloads for execution in a cluster of nodes. The method comprising: displaying on a first electronic device an input video clip in an editing screen of an editing preview application; defining a plurality of layers for display in the editing preview application, the plurality of layers including a first layer comprising a first portion of the input video clip and a second layer comprising a second portion of the input video clip; adjusting characteristics of at least one of the first layer and the second layer to provide an output video clip having a plurality of regions, each corresponding to one of the layers in the plurality of layers; causing the output video clip to be generated from the preview; and causing the output video clip to be transmitted for display on an application running on a second electronic device, wherein the plurality of regions of the output video clip is configured to be displayed in an output video format of the application running on the second electronic device. The output video clip is a composition of the plurality of regions corresponding to the plurality of layers, and adjusting the characteristics of the regions makes characteristics of the regions more similar to each than the characteristics of the corresponding plurality of layers are to each other.

Embodiments of the disclosure may also provide a method of generating an output video clip. The method includes displaying on a first electronic device an input video clip in an editing screen of an editing preview application, where the input video clip may be but is not limited to a short form content video obtained from a live stream. The method further includes defining a plurality of layers for display in the editing preview application, where the plurality of layers includes a first layer comprising a first portion of the input video clip and a second layer comprising a second portion of the input video clip. The method further includes adjusting the characteristics of at least one of the first and second layers to provide an output video clip with a plurality of regions, where each region corresponds to one of the layers in the plurality of layers. The output video clip is a composition of the plurality of regions corresponding to the plurality of layers with characteristics of the regions adjusted to make them more similar to each other than the corresponding layers are to each other. The method further includes causing the output video clip to be generated from the preview and causing the output video clip to be transmitted for display on an application running on a second electronic device, where the plurality of regions of the output video clip is configured to be displayed in an output video format of the application running on the second electronic device.

Embodiments of the disclosure may also provide a method for generating an output video clip, comprising: displaying on a first electronic device an input video clip in an editing screen of an editing preview application; defining a plurality of layers for display in the editing preview application, the plurality of layers including a first layer comprising a first portion of the input video clip, and a second layer comprising a second portion of the input video clip; adjusting, by use of the editing preview application, characteristics of at least one of the first layer and the second layer; forming, by use of the editing preview application, an output video clip having a plurality of regions; causing the output video clip to be generated from the preview; and causing the output video clip to be transmitted to a second electronic device. In some embodiments, the plurality of regions each comprise a different layer of the plurality of layers, and the characteristics of each layer of the plurality of layers corresponding to a region of the plurality of regions, which include the adjusted at least one of the first layer and the second layer, are more similar to each than the characteristics of the defined plurality of layers are to each other.

In the embodiment, the characteristics of the layers of the input video clip include size, position, aspect ratio, frame rate, audio, and background color. The start point in time and ending point in time of portions of the input video clip may be selected.

In other embodiments, the generation of the output video clip includes the removal of backgrounds from a portion of the input video clip, smart text generation from chats received during the playing of the input video clip, addition of audio streams to the output video clip, and volume stabilization throughout the output video clip.

In other embodiments, parameters are sent to a third electronic device along with the input video clip, and the third electronic device generates the output video clip based on the received parameters.

In other embodiments, the output video clip is automatically generated for and sent to several second electronic devices, each with a different format.

Further embodiments include a computer-readable medium containing instructions for carrying out one more aspects of the above method and a system configured to carry out one or more aspects of the above method.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

In embodiments described herein, editing software includes displaying an input video clip on an editing screen of a first electronic device, where the input video clip may be, but is not limited to, a short form video obtained from a live stream. In the editing screen, a number of layers are defined, each with different content and each having characteristics that include an aspect ratio, a position in the editing screen, a frame rate, and possibly an audio stream. The editing software allows the user to preview the video layers and format an output video clip according to selections made in a dropdown box or according to pre-set arrangements in the editing software. The editing software allows the user to adjust the preview by adjusting the characteristics of regions in the output video clip corresponding to the layers in the input video clip. The user may also adjust the previewed input video clip's start and end. The adjusted preview can then be compiled to generate the output video clip, and while the parameters defining the compilation are retained. The editing software creates the output video clip or sends the parameters and the input video clip to another device which generates the output video clip using the received parameters. An automated process may generate and send output video clips to multiple viewing devices, where each output video clip is targeted to the format needed by the different viewing devices.

Figure 1:
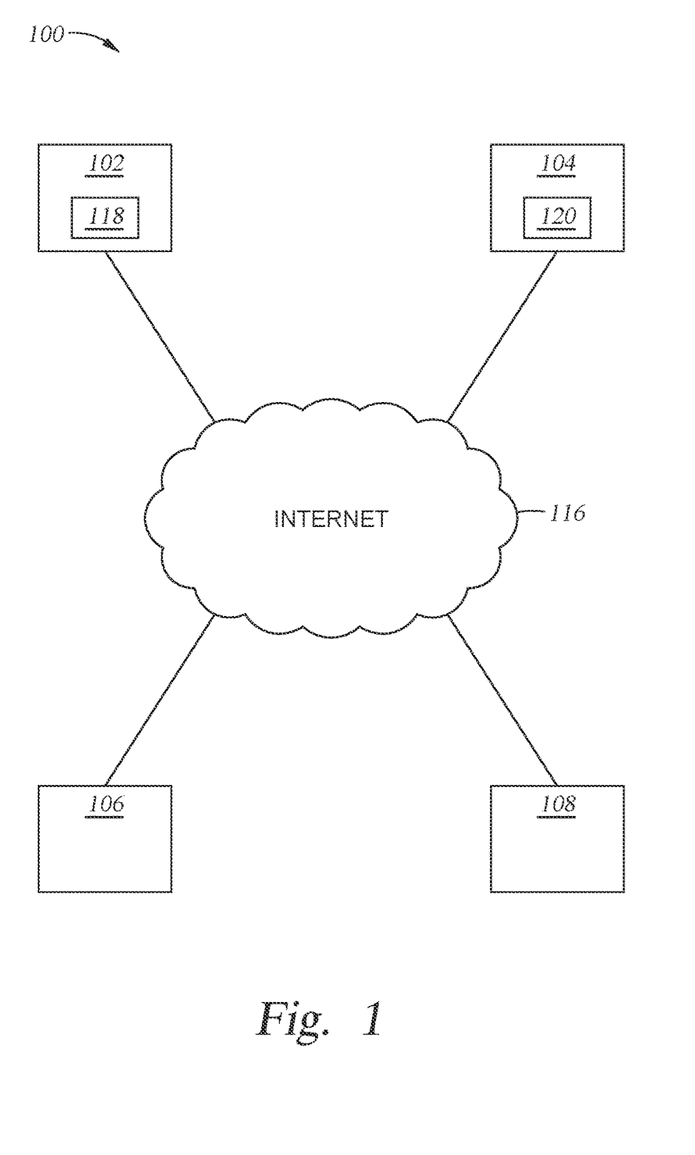
FIG. 1 depicts a media content generation scheme that may be used to perform the methods herein.

FIG. 1 depicts a media generation scheme 100 that may be used to divide selected areas of a first video clip having a first composition, arrange the selected areas to provide a second composition, and compile the composite video data to provide a second video clip having the second composition. The second video clip can then be transmitted to an electronic device, wherein the second video clip is formatted so that it can be displayed on an application that is running on the electronic device.

The media generation scheme 100 includes a user device 102, a server 104, a source for input videos, such as a live-streaming platform 106, configured to generate short-form videos (e.g., clips of live streaming events hosted thereon), and (optionally) a mobile device 108. The media generation scheme 100 further includes a network 116 that facilitates communication between the user device 102 and the server 104 and between the server 104 and the live streaming platform 106. The network 116 generally represents any data communication network suitable for transmitting media content, which can include video and/or audio data (e.g., the Internet), between different locations.

Examples of the user device 102 can include, without limitation, a laptop, a personal computer, a tablet, a smartphone, a virtual or augmented reality computing device, or any related personal computing device. The user device 102 includes an edit preview application 118 stored in a non-volatile memory of the user device 102. The edit preview application 118, when executed by a processor of the user device 102, is configured to receive an input video clip 202 (FIG. 2) from an input video source, provide a preview 222 of a desired output video composition based on user input, determine compositional parameters for the desired output video composition, save the compositional parameters and upload the input video clip 202 and the compositional parameters to the server 104. The server 104 can be a "headless server" and includes a video editing application 120 stored in a non-volatile memory of the server 104. The video editing application 120, when executed by a processor of the server 104, is configured to crop video data from the input video clip 202 according to the compositional parameters, generate composite video data corresponding to the desired output video composition, and compile the composite video data to provide an output video clip in a predetermined format, such as a format suitable for uploading to a mobile social media application stored in a memory of the mobile device 108.

Figure 2:
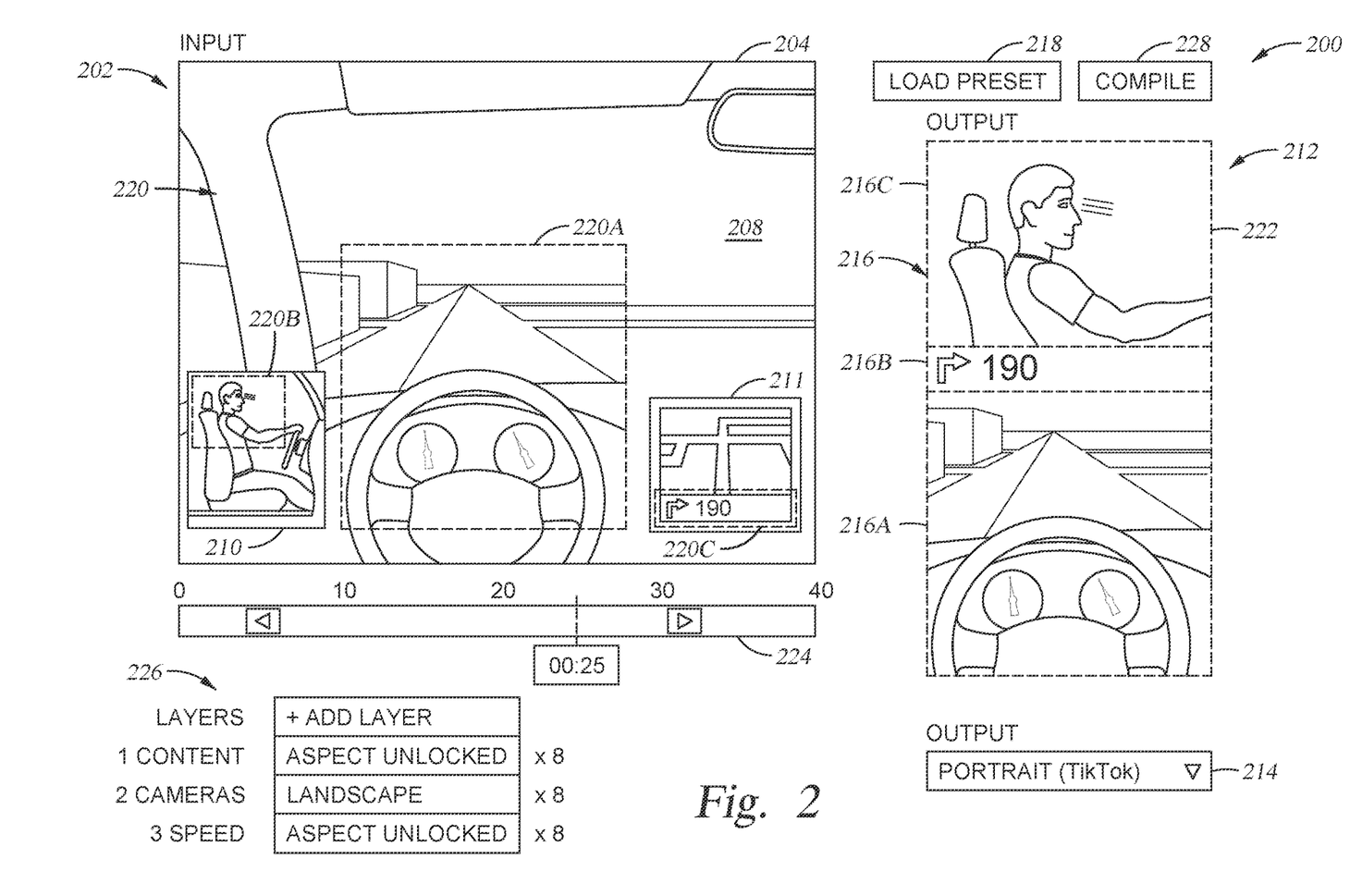
FIG. 2 depicts a user interface display generated by a video editing application executed on a user device, according to one embodiment.

FIG. 2 depicts a schematic representation of a user interface, e.g., an editing screen 200, generated by the edit preview application 118 when executed by the user device 102.

Figure 3:
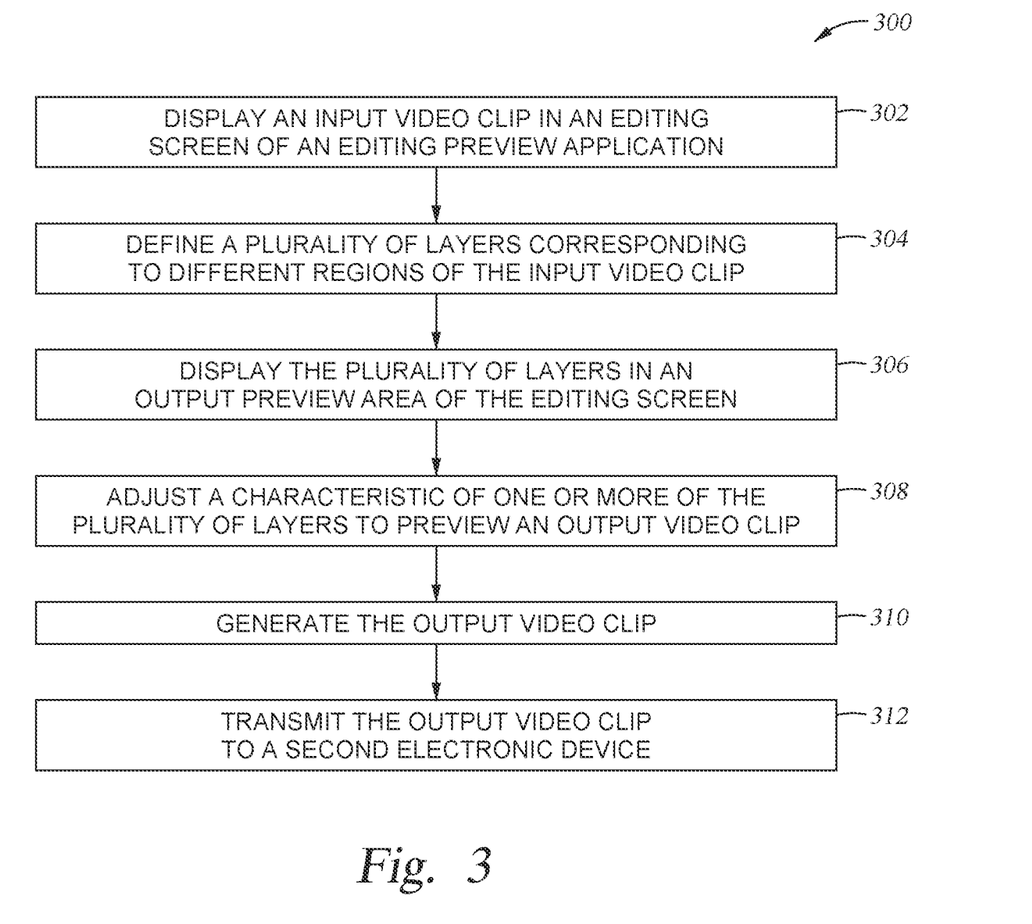
FIG. 3 depicts a diagram of a method of generating media content, according to one embodiment.

FIG. 3 depicts a method 300 of transforming media content for display on the mobile device 108 using the media generation scheme 100 described in FIG. 1, according to one embodiment. Aspects of the method 300 are described with reference to the user interface (editing screen 200) depicted in FIG. 2.

In activity 302, the method 300 includes displaying an input video clip 202 in an editing screen 200 of the edit preview application 118 (editing preview application). Here, the input video clip 202 has a first aspect ratio, a first orientation, and one or more first dimensions that define an input video area 204 in the editing screen 200. As shown, the input video clip comprises a short-form video generated from a Livestream video gaming session, e.g., a driving simulation game. In this example, the Livestream included a display of the driving simulation game 208, a video game content window 211, and a camera feed 210 of the streamer to facilitate engagement with the streamer's fans. In some embodiments, the input video clip is formatted for displaying its content in a horizontal landscape orientation.

In activity 304, the method 300 includes defining a plurality of video layers 220 from the input video clip 202, the plurality of video layers 220 comprising a first video layer 220A corresponding to a first region (the game content region) of the input video area 204, a second video layer 220B corresponding to a second region of the input video area 204 (the streamer's camera region), and (optionally) a third video layer 220C corresponding to a third region of the input video area 204 (a speedometer portion of the video game content window 211). In some embodiments, the layers are used to define and separate different portions of the individual frames of the input video clip. The individual frames used to form the layers may each include different characteristics, such as aspect ratio, position within the video area 204, resolution, frame rate, and audio characteristics, for example, that are derived from the source of the video content.

During activity 304 the edit preview application 118 utilizes pre-set user-defined settings that are used to define the desired content of each of the layers. Based on the user's (e.g., streamer's) knowledge of the structure or characteristics of the input video area 204 the user utilizes aspects of the edit preview application 118 to define the desired portions of the input video area 204, which are used to form each of the layers that are eventually transmitted and displayed on one or more external electronic devices, such as the mobile device 108. Typically, the layout of the input video area 204 of the input video includes a pre-set fixed configuration, and thus the content of the layers for all input videos received and processed by the edit preview application 118 does not require significant adjustment of the pre-set user-defined settings. Characteristics of the layers, such as aspect ratio, position, and/or background color depending on the particular layer, may be locked by a user using a layer menu 226 in the editing preview application 118. For example, a camera region may require a minimum number of pixels to prevent the region from becoming blurry, while a text region may require a white background to make the text readable. As shown in FIG. 2, the layer menu 226 may include a plurality of categories that include one or more selections that each include embedded commands that are used by the edit preview application 118 to adjust one or more characteristics of the layers.

In activity 306, the method 300 includes displaying the plurality of video layers 220 in an output preview area 212 in the editing screen 200 to generate a preview of an output video clip that is to be sent to a second electronic device and displayed thereon. The output preview area 212 may be determined through user input or by determining, using the edit preview application 118, a desired media format for an output video clip. The desired media format may have a second resolution, a second aspect ratio, and one or more second dimensions that define the output preview area 212 when displayed on the editing screen. Generally, the desired media format is based on a selection by a user of a predetermined media format from a plurality of predetermined media formats (dropdown box 214), the plurality of predetermined media formats corresponding to desired formats of corresponding social media applications. In some embodiments, the output preview area 212 is determined by a second resolution, a second aspect ratio, and one or more second dimensions of a video stream formatted for displaying the content of the output video clip in a desired orientation (e.g., vertical portrait orientation) on the mobile device, such as on a mobile application of TikTok, Facebook or Instagram.

In some embodiments, the method 300 includes defining a plurality of regions 216 in the output preview area 212 according to one or more pre-sets. In FIG. 2, the plurality of regions 216 includes a first region 216A, a second region 216B, and a third region 216C, where each of the plurality of regions are different from the other ones in one or more of size, location of the region within the preview, and aspect ratio. In some embodiments, the plurality of regions 216 in the output preview area 212 is defined using one of a plurality of pre-set arrangements 218 selected by a user of the editing preview application 118.

In activity 308, the method 300 includes, based on user input, adjusting a characteristic of one or more of the regions 216 that is to be used to form the output video clip. In some embodiments, the characteristic comprises a size, position, aspect ratio, and/or background color, of one or more of the plurality of regions 216 in the output preview area 212, one or more of the plurality of video layers 220, or a combination thereof, to provide a desired composition of a to-be-generated output video clip. Here, the desired composition corresponds to the preview 222 of the output preview area 212 at the time a user requests compiling the output video clip through the edit preview application 118. In some embodiments, the method 300 further includes adjusting a beginning and end of the output video clip, e.g., by using the slider 224 on the editing screen.

In some embodiments of activity 308, the process includes forming an output video clip having a plurality of regions, wherein the plurality of regions each comprise a layer. Due to the adjustments performed to one or more of the layers during activity 308, the characteristics of the layers disposed within each of the regions, whether they required an adjustment or not, will be more similar to each other than the same layers that were originally defined during activity 304. In this way, the plurality of layers displayed in the output video clip will appear more uniform and/or have less visual or audio related defects than the original portions of the input video clip or audio that were defined during activity 304.

In some embodiments of activity 308, the process includes upscaling or downscaling the video or audio data in one or more of the layers so that the images captured within each layer are configured to fit in their respective region of the output video clip and/or to normalize the appearance of the layers disposed within each of the regions. In one example, each of the layers in the output video clip has a similar resolution and scale.

In activity 310, the method includes generating the output video clip. In some embodiments, the method 300 includes generating, based on the preview 222 of the output video clip area 112, output compilation parameters that can be used to generate the output video clip. In some embodiments, the server 204 generates the output video clip, and the method includes transmitting the output compilation parameters and the input video clip to the server 204. In some embodiments, the method 300 includes transmitting the input video clip 202 and the output compilation parameters to a headless worker software found on the server 204 to generate the output video clip. In some embodiments, the method 300 includes receiving the compilation parameters for generating the output video clip and generating the output video clip using the headless worker software.

In some embodiments, generating the output video clip includes setting the characteristics of the regions to be more similar to each other than the layers of the input video clip are to each other. Thus, the aspect ratio, position, and frame rate of each layer are adjusted to make each region more like the other regions than the corresponding layers were in the input video clip. This adjustment improves the quality of the output video clip because the resolution of the output video clip does not degrade (e.g., pixelate) some regions over other regions.

In some embodiments, generating the output video clip during activity 310 includes transcribing audio data, chat text or other related text information formed during and/or associated with the input video clip and generate a text representation of the audio data, chat text or other related text information in the output video clip. In some embodiments, the transcribed audio data or a chat information provided in the output video clip is provided as a banner within a region of the output video clip. In one example, the transcribed audio data or chat text provided in a banner may replace or supplement the second region 216B in the output preview area 212 in FIG. 2.

In some embodiments, generating the output video clip includes removing or altering the background from portions of the input video clip because some native backgrounds may make audio data, chat text or other text unreadable. In some embodiments, the edit preview application 118 is configured to automatically alter or remove portions of a chat text, such as filler words or other undesirable text.

In some embodiments, generating the output video clip includes adding an audio stream to the output video clip. The audio stream may be generated during or associated with the generation of the input video clip. As noted above, the audio stream may be transcribed and presented in the output video clip in a banner.

In some embodiments, generating the output video clip includes providing pre-set or automatic adjustments to the layers of the input video clip by the edit preview application 118 to stabilize and or damp undesirable characteristics of the input video clip, such as adjust the amount of noise, adjust audio volumes or remove silence from one or more portions of the input video clip.

In some embodiments, generating the output video clip includes cropping portions of the input video clip 202 to generate individual video data corresponding to the plurality of layers 220, combining the video data according to the compilation parameters to generate composite video data, and compiling the composite video data, e.g., by selecting the compile feature to provide a single output video clip having a composition corresponding to the desired preview of the preview 222 of the output preview area 212. For example, in the output video clip depicted in FIG. 2, only a portion of the second input layer 220B and only a portion of the third video layer are present in the corresponding regions.

In some embodiments, as part of activity 310, regions in the output video clip are stitched together, wherein a region displaying content that is the same as in another region allows the regions to be connected seamlessly by their common content regions. In some embodiments, two or more input video clips, which were formed at different times, are stitched together automatically by the edit preview application 118 or by use of user input, wherein a transition between the different video clips is substantially seamless due to the smoothing of characteristics of the input video clip in adjacent portions of each of the layers formed in the serially positioned input video clips. The process of stitching together two or more input video clips may also include inserting pre-set video data that is configured to smooth the transition between adjacently positioned input video clips.

In activity 312, the method includes transmitting the output video clip to a second electronic device, e.g., a mobile phone 108, for display thereon. In some embodiments, the second electronic device is configured to display the output video clip in a second aspect ratio, a second orientation, and one or more second dimensions that are based on the desired output format, where at least one of the second aspect ratio, the second orientation, and one or more second dimensions are different from at least one of the first aspect ratio, the first orientation, and the one or more first dimensions.

In some embodiments, by use of the edit preview application 118, the output video clip is automatically formatted for a number of second electronic devices configured to display the output video clip and sent by use of one or more communication links to each device. In activity 312, the method may include transmitting the output video clip to a plurality of electronic devices that are each configured to display the output video clip in one or more aspect ratios, orientations, and/or one or more dimensions that are based on the desired output format for the receiving electronic device of the plurality of electronic devices.

While the foregoing is directed to embodiments of the present disclosure, other and further embodiments of the disclosure may be devised without departing from the basic scope thereof, and the scope thereof is determined by the claims that follow.

What is claimed is:

1. A method for generating an output video clip, the method comprising:
    displaying on a first electronic device an input video clip in an editing screen of an editing preview application;
    defining a plurality of layer portions for display within an output video display preview in the editing preview application, the output video display preview comprising the plurality of layer portions including a first layer portion comprising a first clip portion of the input video clip and a second layer portion comprising a second clip portion of the input video clip;

adjusting one or more characteristics of at least one of the first layer portion and the second layer portion within the output video display preview;

forming an output video clip having a plurality of regions, wherein the plurality of regions each comprise a different layer portion of the plurality of layer portions, and the characteristics of the layer portions in the regions of the plurality of regions, which include the adjusted at least one of the first layer portion and the second layer portion, are more similar to each other than the characteristics of the initially defined plurality of layer portions are to each other;

causing the output video clip to be generated from the output video display preview; and causing the output video clip to be transmitted to a second electronic device.

2. The method of claim 1, further comprising sending parameters and the input video clip to a third electronic device, wherein the output video clip is generated by the third electronic device using the input video clip and the parameters.

3. The method of claim 2, further comprising:

generating, using the first electronic device, the parameters based on the output video display preview of the output video clip;

saving the parameters using the first electronic device; and transmitting the parameters to the third electronic device, wherein the third electronic device uses the parameters to generate the output video clip.

4. The method of claim 1, wherein the characteristics include at least one of an aspect ratio, position within a video area, resolution, frame rate, and audio characteristics.

5. The method of claim 1, wherein the input video clip comprises short-form video content generated from a live-streaming event.

6. The method of claim 1, wherein the input video clip has a resolution and an aspect ratio for displaying its content in a horizontal landscape orientation.

7. The method of claim 1, wherein the output video display preview of the output video clip has a resolution and an aspect ratio for displaying content of the output video clip in a vertical portrait orientation on the second electronic device.

8. The method of claim 1, wherein the first layer comprises game content and the second layer comprises a view of a user's camera.

9. The method of claim 1, wherein each one of the plurality of layer portions having a fixed field of view within the input video clip.

10. A system for generating an output video clip, the system comprising:

a processor; and a memory having loaded therein for execution by the processor an edit preview application, wherein the edit preview application is configured to:

display on a first electronic device an input video clip in an editing screen of an editing preview application;

define a plurality of layer portions for display within an output video display preview in the editing preview application, the output video display preview comprising the plurality of layer portions including a first layer portion comprising a first clip portion of the input video clip and a second layer portion comprising a second clip portion of the input video clip;

adjust characteristics of at least one of the first layer portion and the second layer portion within the output video display preview;

form an output video clip in which the first layer portion and the second layer portion are each disposed in separate regions of a plurality of regions formed within the output video clip, wherein the adjusted characteristics of the at least one of the first layer portion and the second layer portion makes characteristics of the first layer portion and the second layer portion more similar to each other;

cause the output video clip to be generated from the output video display preview; and cause the output video clip to be transmitted for display on an application running on a second electronic device, wherein the plurality of regions of the output video clip is configured to be displayed in an output video format of the application running on the second electronic device.

11. The system of claim 10, wherein the edit preview application is further configured to send parameters and the input video clip to a third electronic device, wherein the output video clip is generated by the third electronic device using the input video clip and the parameters.

12. The system of claim 11, wherein the editing preview application is further configured to:

generate, using the first electronic device, the parameters based on the output video display preview of the output video clip;

save the parameters using the first electronic device for re-use in generating the output video; and transmit the parameters to the third electronic device, wherein the third electronic device uses the parameters to generate the output video clip.

13. The system of claim 10, wherein the characteristics include an aspect ratio, position within a video area, resolution, frame rate, and audio characteristics.

14. The system of claim 10, wherein the input video clip comprises short-form video content generated from a live-streaming event on a live-streaming service.

15. The system of claim 10, wherein the input video clip has an aspect ratio for displaying its content in a horizontal landscape orientation.

16. The system of claim 10, wherein the output video display preview of the output video clip has a resolution and an aspect ratio for displaying content of the output video clip in a vertical portrait orientation on the second electronic device.

17. The method of claim 10, wherein each one of the plurality of layer portions having a fixed field of view within the input video clip.

18. A non-transitory computer-readable medium comprising instructions that are executable in a processor of a computer system to carry out a method of scheduling a plurality of workloads for execution in a cluster of nodes, the method comprising:

displaying on a first electronic device an input video clip in an editing screen of an editing preview application;

defining a plurality of layer portions for display as an output video display preview in the editing preview application, the output video display preview comprising the plurality of layer portions including a first layer portion comprising a first clip portion of the input video clip and a second layer portion comprising a second clip portion of the input video clip; and adjusting characteristics of at least one of the first layer portion and the second layer portion to provide an output video clip having a plurality of regions, each corresponding to one of the layer portions in the plurality of layer portions within the output video display preview, wherein
- the output video clip is a composition of the plurality of regions corresponding to the plurality of layer portions, and
- adjusting the characteristics of the regions makes characteristics of the regions more similar to each other than the characteristics of the corresponding plurality of layer portions are to each other;

causing the output video clip to be generated from the output video display preview; and causing the output video clip to be transmitted to a second electronic device, wherein the plurality of regions of the output video clip is configured to be displayed in an output video format of an application running on a third electronic device.

19. The non-transitory computer-readable medium of claim 18, the method further comprising:
- generating, using the first electronic device, the parameters based on the output video display preview of the output video clip;
- saving the parameters using the first electronic device; and
- transmitting the parameters to the second electronic device, wherein the second electronic device uses the parameters to generate the output video clip.

20. The non-transitory computer-readable medium of claim 18, wherein the output video clip has an output format selected for a social media application operated by the second electronic device.

21. The non-transitory computer-readable medium of claim 18, wherein the output video display preview of the output video clip has a resolution and an aspect ratio for displaying content of the output video clip in a vertical portrait orientation on the second electronic device.

22. The method of claim 18, wherein each one of the plurality of layer portions having a fixed field of view within the input video clip.

23. A method for generating an output video clip, comprising:
- displaying on a first electronic device an input video clip in an editing screen of an editing preview application;
- defining a plurality of layer portions for display as an output video display preview in the editing preview application, output video display preview comprising the plurality of layer portions including
  - a first layer portion comprising a first clip portion of the input video clip, and
  - a second layer portion comprising a second clip portion of the input video clip;
- adjusting, by use of the editing preview application, characteristics of at least one of the first layer portion and the second layer portion;
- forming, by use of the editing preview application, an output video clip having a plurality of regions, wherein
  - the plurality of regions each comprise a different layer portion of the plurality of layer portions, and
  - the characteristics of each layer portion of the plurality of layer portions corresponding to a region of the plurality of regions, which include the adjusted at least one of the first layer portion and the second layer portion, are more similar to each other than the characteristics of the defined plurality of layer portions are to each other;
- causing the output video clip to be generated from the output video display preview; and
- causing the output video clip to be transmitted to a second electronic device.

24. The method of claim 23, wherein each one of the plurality of layer portions having a fixed field of view within the input video clip.

* * * * *